(12) United States Patent
Peeler et al.

(10) Patent No.: US 11,429,155 B2
(45) Date of Patent: Aug. 30, 2022

(54) INFORMATION HANDLING SYSTEM INCLUDING DYNAMIC CONFIGURATION OF PIEZOELECTRIC TRANSDUCERS FOR MULTI-FUNCTIONALITY

(71) Applicant: Dell Products L.P., Round Rock, TX (US)

(72) Inventors: Douglas Jarrett Peeler, Austin, TX (US); Srinivas Kamepalli, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/589,482

(22) Filed: Oct. 1, 2019

(65) Prior Publication Data

US 2021/0096613 A1 Apr. 1, 2021

(51) Int. Cl.
  *G06F 1/16* (2006.01)
  *G06F 3/01* (2006.01)
  *H04R 17/10* (2006.01)

(52) U.S. Cl.
  CPC ............ *G06F 1/1688* (2013.01); *G06F 3/011* (2013.01); *G06F 3/016* (2013.01); *H04R 17/10* (2013.01)

(58) Field of Classification Search
  CPC ........ G06F 1/1688; G06F 3/016; G06F 3/011; H04R 17/10
  See application file for complete search history.

(56) References Cited

U.S. PATENT DOCUMENTS

| | | | |
|---|---|---|---|
| 7,639,826 B1 | 12/2009 | Azima et al. | |
| 8,243,964 B2 | 8/2012 | Eaton | |
| 8,594,815 B2 | 11/2013 | Konetski et al. | |
| 9,723,119 B2 | 8/2017 | Peeler et al. | |
| 9,877,112 B2 | 1/2018 | Srivastava et al. | |
| 9,898,904 B1* | 2/2018 | Levesque ............... | G08B 6/00 |
| 9,983,678 B1* | 5/2018 | Saboune ............... | G06F 3/016 |
| 9,992,593 B2 | 6/2018 | Ancona et al. | |
| 10,142,717 B2* | 11/2018 | Behles ............... | G06F 1/1626 |
| 10,405,077 B2* | 9/2019 | Behles ............... | G06F 3/041 |
| 2004/0227721 A1 | 11/2004 | Moilanen et al. | |
| 2005/0128322 A1 | 6/2005 | Eaton et al. | |
| 2010/0148945 A1 | 6/2010 | Yun et al. | |
| 2010/0182263 A1 | 7/2010 | Aunio et al. | |

(Continued)

*Primary Examiner* — Anthony M Haughton
*Assistant Examiner* — Theron S Milliser
(74) *Attorney, Agent, or Firm* — Zagorin Cave LLP

(57) ABSTRACT

An information handling system includes an outer housing and a processor and a memory disposed in the outer housing. The processor is configured to execute instructions to process information. The memory is configured to store the information. The information handling system includes a piezoelectric transducer disposed in the outer housing and mechanically coupled to a surface held by the outer housing. The information handling system includes a sensor disposed in the outer housing and configured to generate an indicator of user presence in a zone proximate to the piezoelectric transducer and above a second side of the surface. The information handling system includes a controller disposed in the outer housing and coupled to the memory. The controller is configured to selectively configure the piezoelectric transducer to be responsive to a first subsystem or to be responsive to a second subsystem according to the indicator of user presence.

8 Claims, 5 Drawing Sheets

(56) References Cited

U.S. PATENT DOCUMENTS

| | | |
|---|---|---|
| 2011/0123051 A1 | 5/2011 | Eaton |
| 2014/0256438 A1* | 9/2014 | Grant ................. G06F 3/013 463/36 |
| 2014/0306904 A1 | 10/2014 | Modarres et al. |
| 2015/0070150 A1* | 3/2015 | Levesque ............. H04N 21/84 340/407.1 |
| 2015/0185842 A1 | 7/2015 | Picciotto et al. |
| 2015/0323992 A1 | 11/2015 | Einaudi |
| 2015/0373441 A1* | 12/2015 | Behles ................. H04R 1/028 381/333 |
| 2016/0105749 A1 | 4/2016 | Qutub et al. |
| 2017/0038856 A1* | 2/2017 | Missig ..................... G06F 8/34 |
| 2018/0061191 A1* | 3/2018 | Alghooneh ........... G06F 1/163 |
| 2018/0081477 A1 | 3/2018 | Picciotto et al. |
| 2018/0181200 A1* | 6/2018 | Olien ................... G06F 3/0414 |
| 2018/0181201 A1* | 6/2018 | Grant ................... G06F 3/013 |
| 2019/0064997 A1* | 2/2019 | Wang ................... G06F 3/0418 |
| 2019/0082248 A1* | 3/2019 | Behles ................. G06F 1/1626 |
| 2019/0163280 A1* | 5/2019 | Schwab ............... G06F 3/0414 |
| 2019/0182573 A1* | 6/2019 | Shin ..................... G06F 1/1616 |
| 2019/0261094 A1* | 8/2019 | Greenlee ................ H04R 5/04 |
| 2019/0335260 A1* | 10/2019 | Behles .................... H04R 7/20 |

\* cited by examiner

INFORMATION HANDLING SYSTEM INCLUDING DYNAMIC CONFIGURATION OF PIEZOELECTRIC TRANSDUCERS FOR MULTI-FUNCTIONALITY

BACKGROUND

Field of the Invention

The present invention relates to information handling systems, and more particularly to information handling systems including piezoelectric transducers.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An exemplary information handling system includes piezoelectric transducers configured as part of an audio subsystem, input subsystem, or haptic feedback subsystem. If more than one use occurs simultaneously, interaction of the uses may degrade the user experience. Use of multiple piezoelectric transducers in the same locations for multiple applications can realize multiple uses simultaneously. However, under some circumstances, when multiple use cases occur simultaneously, interaction between vibrations generated for different applications can degrade the user experience. For example, if a user of an information handling system is listening to music generated by an audio subsystem of the information handling system, hand placement of the user for typing, using a touchpad, or touch screen, may be disrupted by the vibrations for generating sound. Accordingly, improved techniques for implementing subsystems using piezoelectric transducers are desired.

SUMMARY OF EMBODIMENTS OF THE INVENTION

In at least one embodiment, an information handling system includes an outer housing and a processor disposed in the outer housing. The processor is configured to execute instructions to process information. The information handling system includes a memory disposed in the outer housing. The memory is configured to store the information. The information handling system includes a piezoelectric transducer disposed in the outer housing and mechanically coupled to a first side of a surface held by the outer housing. The information handling system includes a sensor disposed in the outer housing and configured to generate an indicator of user presence in a zone proximate to the piezoelectric transducer and above a second side of the surface. The information handling system includes a controller disposed in the outer housing and coupled to the memory. The controller is configured to selectively configure the piezoelectric transducer to be responsive to a first subsystem or to be responsive to a second subsystem according to the indicator of user presence.

In at least one embodiment, a method for operating an information handling system includes selectively configuring a piezoelectric transducer mechanically coupled to a surface to operate responsive to a first subsystem in response to detection of presence of a user in a zone proximate to the information handling system. The method includes selectively configuring the piezoelectric transducer mechanically coupled to the surface to operate responsive to a second subsystem in response to detection of absence of the user in the zone proximate to the information handling system.

In at least one embodiment, an apparatus includes a plurality of piezoelectric transducers and a surface mechanically coupled to the plurality of piezoelectric transducers. The apparatus includes a sensor configured to generate an indicator of user presence proximate to the plurality of piezoelectric transducers. The apparatus includes a controller configured to selectively configure each piezoelectric transducer of the plurality of piezoelectric transducers to generate vibrations as part of a distributed mode loudspeaker or to generate local vibrations in response to a haptic feedback subsystem according to the indicator of user presence.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
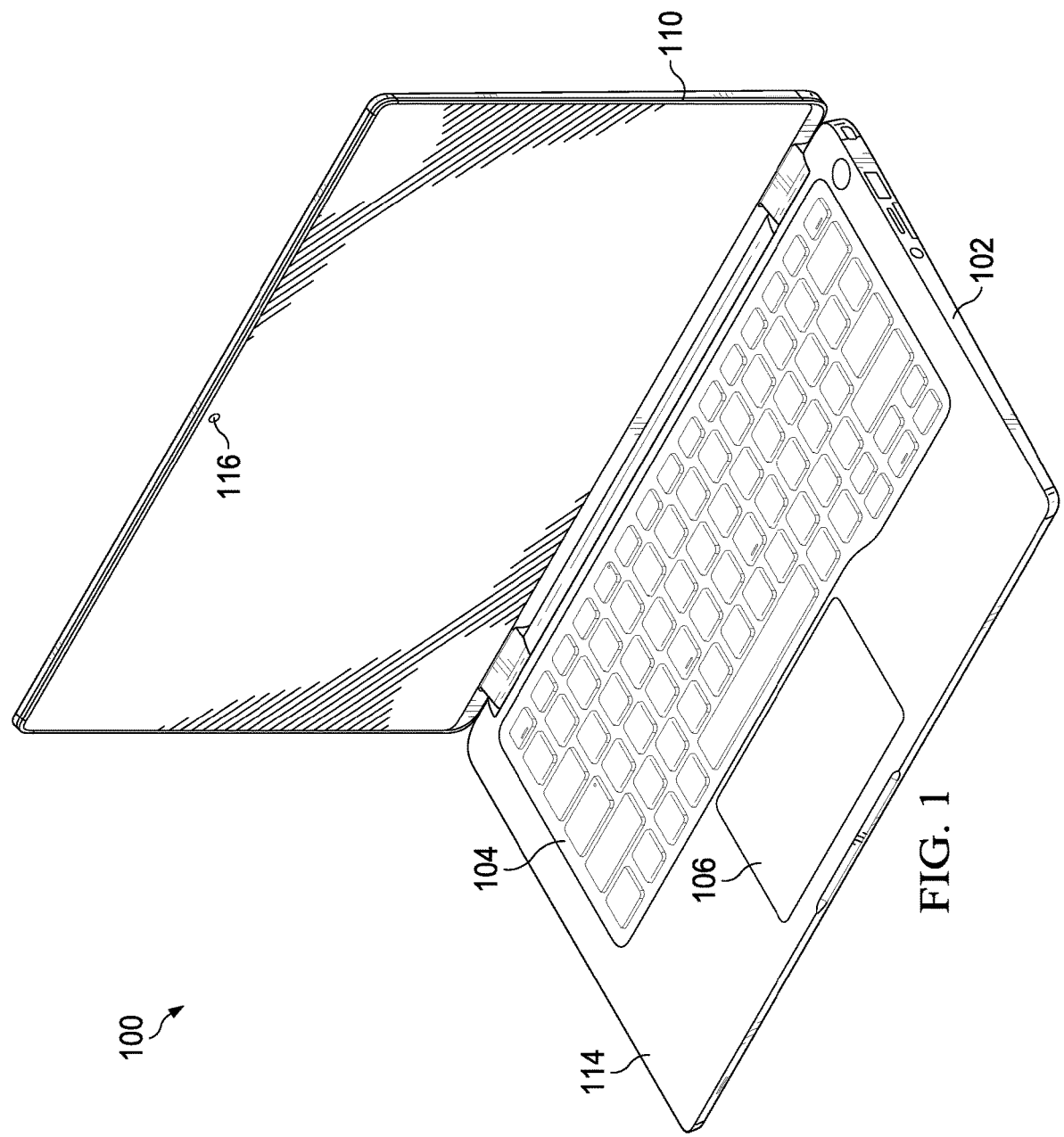
FIG. 1 illustrates a perspective view of an information handling system.

FIG. 1 illustrates an exemplary information handling system (e.g., laptop computing device, tablet computing device, or other portable information handling system) that implements dynamic configuration of piezoelectric transducers to provide multi-functionality. Dynamic configuration of piezoelectric transducers reduces the number of piezoelectric transducers included in the information handling system and reduces or eliminates degradation of the user experience when multiple subsystems that use piezoelectric transducers operate simultaneously. During operation of information handling system 100, a variety of hardware and software elements cooperate to select and present user interfaces that enhance user interactions. In at least one embodiment, an operating system generally coordinates interactions with user devices, such as a keyboard, mouse, touchpad, or display.

Outer housing of information handling system 100 includes lid housing portion 110 and base housing portion 102. Lid housing portion 110 includes display 108. In at least one embodiment, display 108 includes a touchscreen (e.g., capacitive touchscreen) user interface. Base housing portion 102 includes keyboard 104 and touch pad of a user input subsystem. In one embodiment, rather than include a keyboard and touch pad, a second display (e.g., capacitive touchscreen) is included as the user input subsystem. A user sets an input value by touching the touchscreen at a user interface location. Touchscreen user interfaces may define values with input buttons presented by an application or may define a user interface that more generally accepts user inputs. For example, an operating system executing on the information handling system supports presentation of a keyboard user interface on a touchscreen and then accepts user inputs as touches at the keyboard that have the key value presented in the user interface. Touchscreen keyboard displays provide a convenient input device for portable information handling systems that lack an integrated keyboard. Typically, a touchscreen display includes a touch controller interfaced with capacitive sensors of display 108 to determine the location of touches and to provide the location to the operating system. Touch controllers typically execute embedded code on a microcontroller so that capacitive values sensed at the touchscreen are constantly scanned or monitored to determine touch inputs. Various touch algorithms apply touch area size, detected capacitance and the amount of time that the touch is detected to discriminate between intentional inputs and incidental touches.

In at least one embodiment, information handling system 100 includes an audio system that provides sound to a user of information handling system 100. Reduced profile information handling systems (e.g., laptops or tablets) include a distributed mode loudspeaker implemented using piezoelectric transducers that directly contact a solid panel or surface in lid housing portion 110 and base housing portion 102 and induce uniformly distributed vibration modes in that surface. An audio subsystem drives piezoelectric transducers with signals having intensities and frequency responses that excite natural resonant modal structure of the surface to cause the surface to vibrate and generate sound.

In addition, information handling system 100 includes a haptic feedback system that implements haptic feedback technology. The haptic feedback system provides a force, vibration, motion, or sound to a user in response to user input to enhance user experience with a device. For example, a touchscreen keyboard (or other user input device in lid housing portion 110 and base housing portion 102) is dynamically configured to provide haptic feedback that locally vibrates a surface to simulate depressing key when virtual keys are displayed. A haptic feedback controller generates signals that control the frequency, duration, or intensity of the haptic feedback according to predetermined settings. The controller configures a piezoelectric transducer to provide vibration or movement to indicate to a user that an input value was detected in association with a user interface, such as by clicking at an incremental input. In an embodiment, a haptic feedback system includes an array of piezoelectric transducers that cause local vibration of a surface to generate haptic effects (e.g., sound or tactile vibration) in response to user input. In some embodiments, information handling system 100 also includes an input subsystem that configures piezoelectric transducers to generate electrical signals in response to a force on the surface.

Figure 2:
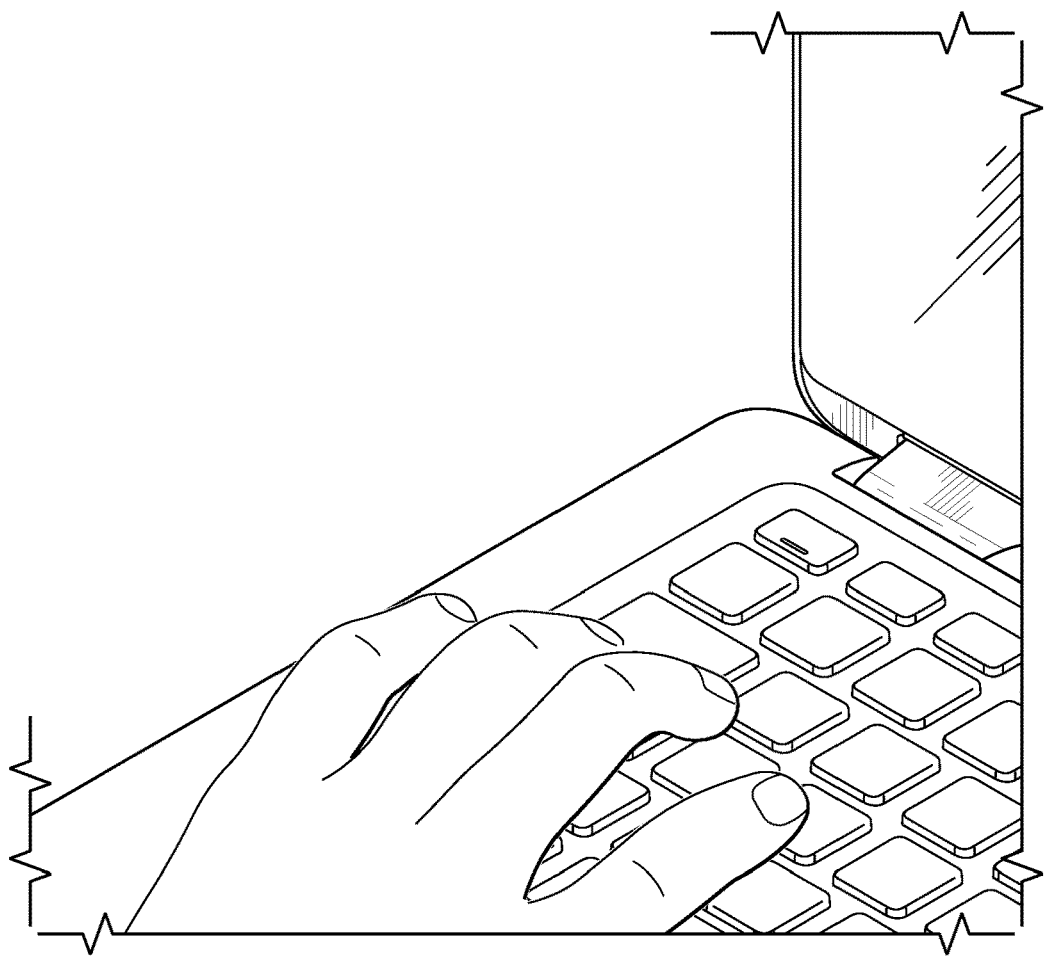
FIG. 2 illustrates a user digit in a zone proximate to the information handling system of FIG. 1.

Information handling system 100 implements selective configuration of piezoelectric transducers to provide multi-functionality without significant degradation of the user experience. In at least one embodiment of information handling system 100, base housing portion 102 includes an input subsystem, e.g., keyboard, touchpad, function button, and various other input devices. An array of piezoelectric transducers is included within lid housing portion 110, beneath display 108, or in base housing portion 102, beneath the keyboard and palm rest 114. In at least one embodiment, lid housing portion 110 includes camera 116, although in other embodiments one or more cameras or proximity detectors are included in lid housing portion 110 or base housing portion 102. For example, a proximity sensor uses an electromagnetic field or a beam of electromagnetic radiation and detects changes in the field or return signal to detect presence of a user digit in a zone proximate to a keyboard or other portion of information handling system 100. Camera 116 or other proximity sensors are used to detect the presence of a user (e.g., a user digit) without physical contact, as illustrated in FIG. 2. A processor coupled to or incorporated with camera 116 or other sensors uses signal processing techniques to determine presence of a user (e.g., user digit) in one or more zones proximate to one or more corresponding piezoelectric transducers based on images provided by camera 116 or sensor signals, respectively.

Figure 3:
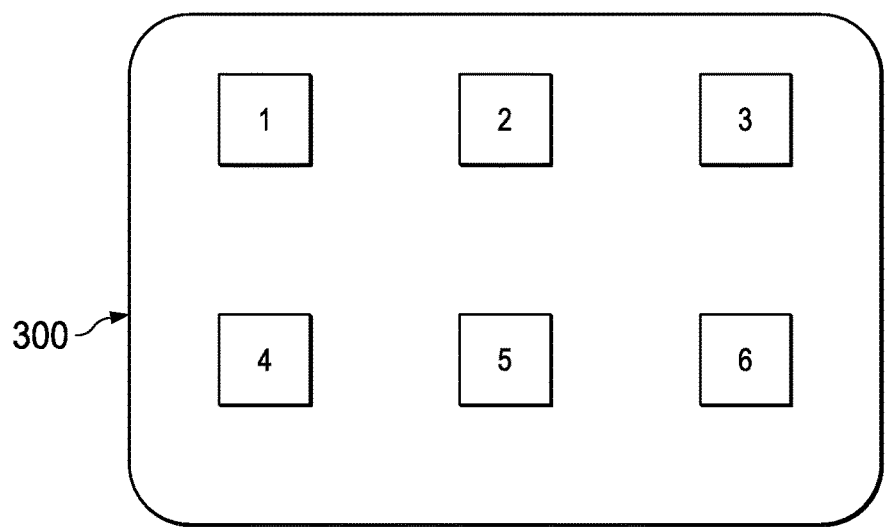
FIG. 3 illustrates zones of the information handling system of FIG. 1.

FIG. 3 illustrates exemplary zones of piezoelectric transducers distributed across surface 300 for selective configuration according to multiple subsystems of an information handling system. In at least one embodiment, the placement of piezoelectric transducers corresponds to the natural resonant model of the surface or panel for use in an audio subsystem as a distributed mode loudspeaker. The natural resonant model of the surface or panel will vary according to material, size, and shape of the surface or panel, according to sizes of the piezoelectric transducers, and according to amplitude and duration of corresponding electrical signals. Each piezoelectric transducer is associated with a zone above a surface or panel in which a sensor detects presence or absence of a user (e.g., a user digit). Although only six zones are illustrated in FIG. 3, other embodiments of an information handling system include other numbers of zones (e.g., an N×M grid of zones, where N and M are each integers greater than or equal to one) or other shapes (e.g., zones that correspond to regions of input devices on main housing portion). For example, a piezoelectric transducer array that is selectively configurable for use in different subsystems includes zones that correspond to the keys of a keyboard, zones of a touch pad, and zones of a palm rest with no user input devices.

In at least one embodiment, in a default configuration, all zones of a piezoelectric transducer array are selectively configured to be controlled by an audio subsystem. However, in other embodiments, a portion of the zones are selectively configured to be controlled by the audio subsystem and others are selectively configured to be controlled by a haptic feedback subsystem. For example, the zones associated with the keyboard and touch pad are selectively driven by the audio subsystem or the haptic feedback subsystem, while other zones that are not associated with user input are always driven according to signals generated by the audio subsystem. Note that subsystems described herein are exemplary only and in other embodiments of an information handling system, an array of piezoelectric transducers are selectively configured for operation in different combinations of subsystems. In at least one embodiment, a controller loads a predetermined configuration from memory (e.g., all zones used for sound or some zones used for sound) or may have a fixed configuration of selectively enablable zones. The technique that configures one array of piezoelectric transducers to service multiple subsystems, thereby reducing the number of piezoelectric transducers included in an information handling system, which can reduce cost, power consumption, and size of the information handling system.

In general, a piezoelectric transducer includes a material that exhibits the piezoelectric effect by mechanically deforming when exposed to an electric field, thus producing mechanical energy (e.g., pressure, acceleration, strain, force, or torque) in response to received electric signals. A bi-directional piezoelectric transducer can be configured to convert mechanical energy (e.g., pressure) into an electrical signal and can be configured to convert an electrical signal into mechanical energy. In at least one embodiment, the piezoelectric transducer includes piezoelectric electric materials in a multi-laminar structure (e.g., manufactured using processes similar to semiconductor manufacturing processes) that includes vertical crystals, horizontal crystals, or other piezoelectric material structures. The piezoelectric transducer is mechanically coupled to (e.g., in contact with) a surface or panel to sense pressure, create localized vibrations, or generate sound as part of a distributed mode loudspeaker.

Figure 4:
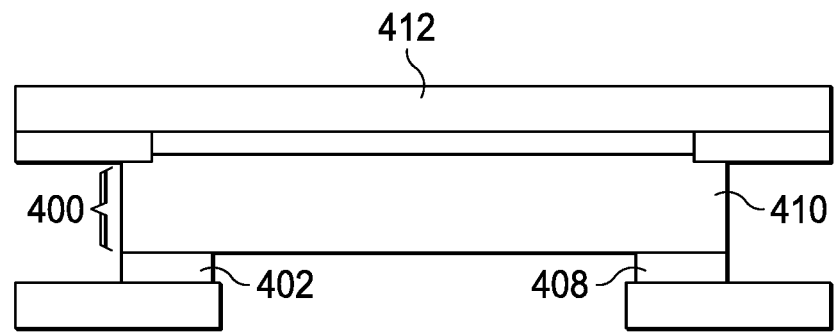
FIG. 4 illustrates an exemplary cross-sectional view of a piezoelectric transducer in Contact with a surface of an information handling system.

FIG. 4 illustrates an exemplary piezoelectric transducer. Piezoelectric transducer 400 includes electrical contacts 402 and 408 that are electrically connected to piezoelectric material 410. Surface 412 (e.g., a plastic, glass, or metal surface) is mechanically coupled to piezoelectric material 410. In at least one configuration of piezoelectric transducer 400, a force applied to surface 412 causes piezoelectric material 410 to generate an electrical signal through electrical contacts 402 and 408. In general, a bi-directional piezoelectric transducer (e.g., high-voltage single layer devices or lower voltage, multi-layer devices) has a sensitivity in a range that is suitable to detect pressure applied to the surface and suitable for generating vibrations appropriate for audio applications or a haptic feedback application. For example, the voltage and blocking force $F_{max}$ (i.e., the maximum force that is generated by the transducer, which is achieved when displacement of the transducer is completely blocked) is suitable for audio and haptic feedback applications. In at least one embodiment, piezoelectric transducer 400 is capable of configuration for generating sound and for generating haptic feedback and is driven using signals generated by a selected subsystem.

In a distributed mode loudspeaker configuration, piezoelectric transducer 400 receives electrical signals from an audio subsystem via electrical contacts 402 and 408. Those electrical signals cause displacement of piezoelectric material 410 with respect to surface 412 with an intensity and frequency response that induces uniformly distributed vibration modes in surface 412. In a haptic feedback configuration, piezoelectric transducer 400 receives electrical signals from a haptic feedback subsystem via electrical contacts 402 and 408. Those electrical signals cause displacement of piezoelectric material 410 with respect to surface 412 with an intensity and frequency response that induces localized vibrations in surface 412. In some embodiments, lower frequency signals (e.g., signals having frequencies below audible frequencies or in the lower frequency range of audible signals) or low volume signals (e.g., signals having volumes that are less audible or inaudible relative to sound produced by the audio system) are used to induce the localized vibrations used by a haptic feedback system to reduce or eliminate any disruption to user experience for the audio system. Intensity may vary according to surface 412 (e.g., according to material thickness or material type of surface 412).

Figure 5:
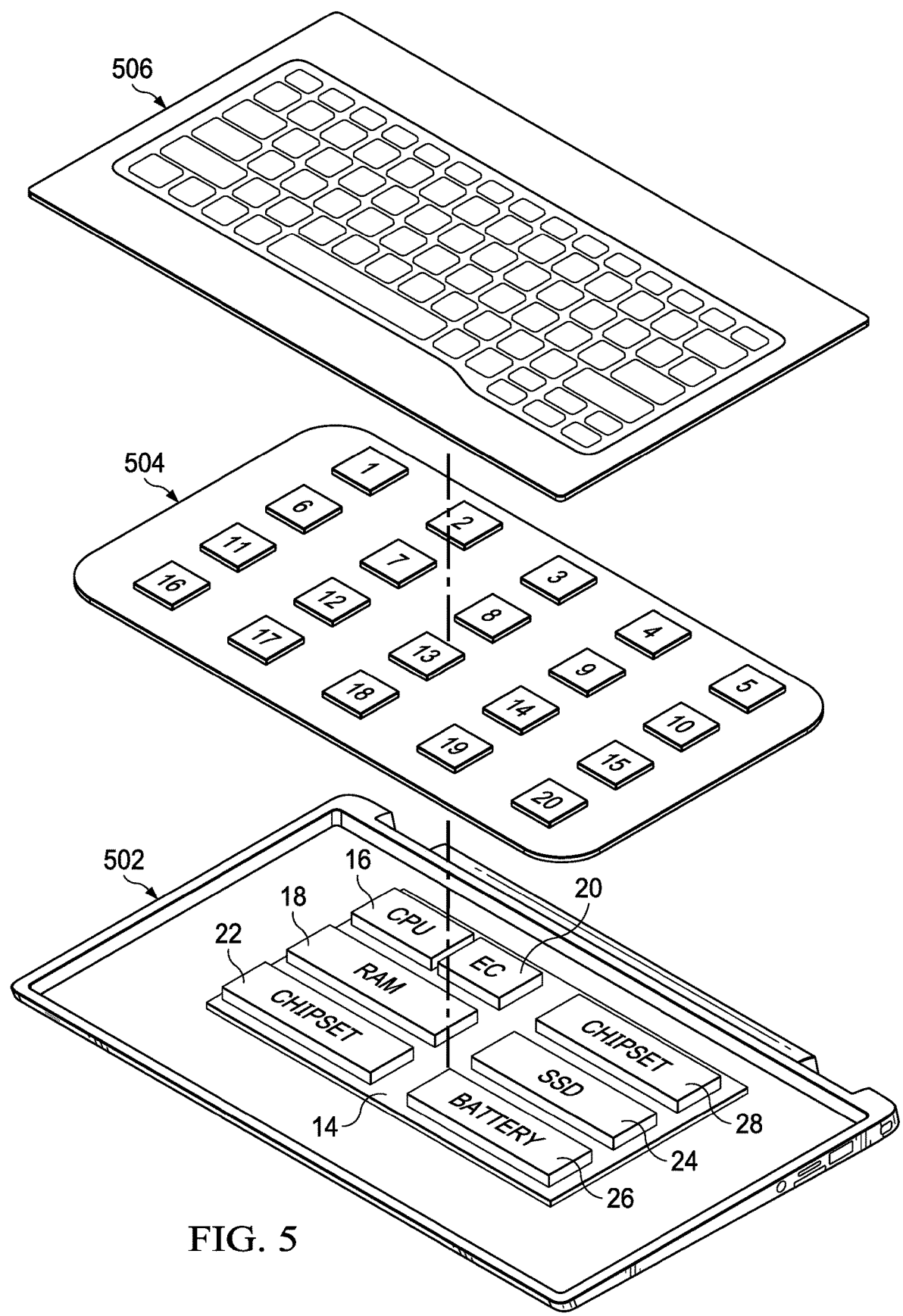
FIG. 5 illustrates an exploded view of a surface, array of piezoelectric transducers, and a motherboard in a housing of an information handling system consistent with at least one embodiment of the invention.

Referring to FIG. 5, in an embodiment of an information handling system, base housing portion 502, which includes motherboard 14, also houses piezoelectric transducers 504 that are in contact with (i.e., are mechanically coupled to) a side of display 506. Display 506 is a touchscreen user interface that displays a keyboard. Display 506 provides a surface for piezoelectric transducers 504 that are selectively configurable to cause display 506 to vibrate as part of a haptic feedback subsystem to simulate depressing a key when virtual keys displayed or to vibrate as part of a distributed mode loudspeaker as part of an audio subsystem. In at least one embodiment, at least some of the piezoelectric transducers 504 are bi-directional and can be selectively configured as part of the input subsystem, an audio subsystem, a haptic feedback subsystem, or other subsystem. The piezoelectric transducer converts electrical signals into mechanical energy or converts mechanical energy (e.g., pressure) into an electrical signal (e.g., converts pressure applied to an input device into an electrical signal) according to a selected mode of operation.

In at least one embodiment of an information handling system, base housing portion 502 includes a motherboard 14 supporting processing components that cooperate to process information. For example, central processing unit 16 executes instructions to process information stored in a random-access memory (RAM) 18, such as instructions of an operating system and applications. Embedded controller 20 manages power and interactions with input/output devices. Chipset 22 includes at least portions of an audio subsystem 606, a haptic feedback subsystem 604, and controller 608 described below. Chipset 28 manages operation of central processing unit 16, such as providing power, clock and memory access functions. In an exemplary embodiment, motherboard 14 fits into outer housing portion 502 along with other components, such as solid-state drive (SSD) 24 and battery 26. In addition to the components depicted in the exemplary embodiment, other types of components may be included, such as to support graphics processing, wireless communication, or peripheral device interfaces.

Figure 6:
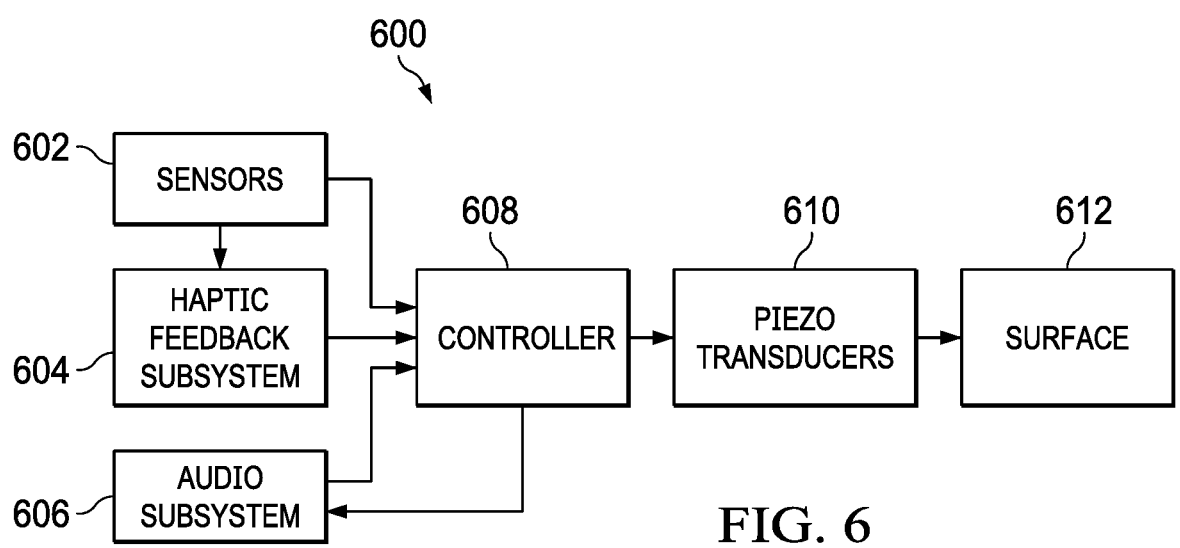
FIG. 6 illustrates a functional block diagram of a system of the portable information handling system including dynamic configuration of multi-zone piezoelectric transducers for multi-functionality consistent with at least one embodiment of the invention.

Referring to FIG. 6, information handling system 600 includes audio subsystem 606, haptic feedback subsystem 604, and controller 608 that selectively configures piezoelectric transducers 610 in response to sensor signals for zones proximate to piezoelectric transducers 610. In at least one embodiment, audio subsystem 606 uses maps of zones of the piezoelectric transducers to generate audio configuration signals to control piezoelectric transducers 610 as part of a distributed mode loudspeaker. The maps of zones may include a left zone and a right zone for left and right channels of stereo audio output and subzones within each of the left zone and right zone. Audio subsystem 606 sends signals to controller 608, which selectively sends those signals to piezoelectric transducers 610 that are mechanically coupled to a surface of the information handling system. While sending left and right channel audio, controller 608 selectively blocks signals generated by the audio subsystem 606 that are associated with one or more subzones of piezoelectric transducers to disable corresponding piezoelectric transducer of piezoelectric transducers 610 according to proximity information received from sensor 602. Sensor 602 includes a capacitive sensor, a camera, a piezoelectric transducer configured as a pressure sensor, or other proximity sensor In at least one embodiment, controller 608 uses signal processing techniques to determine presence of a user (e.g., user digit) in one or more zones proximate to one or more corresponding piezoelectric transducers based on signals received from sensor 602.

In at least one embodiment, controller 608 provides a feedback signal to audio subsystem 606 that indicates any subzones that are disabled in response to detecting a user in a zone proximate to the piezoelectric transducer. Audio subsystem 606 uses that feedback information to update filter algorithms and gain functions to generate electrical signals with intensity and frequency response to induce uniformly distributed vibration modes in a surface using any piezoelectric transducers selectively enabled to be driven by audio subsystem 606. Initially, the filter or gain is based on a frequency response for all of the piezoelectric transducers being enabled. Disabling one or more piezoelectric transducers in response to user presence changes the frequency response of the distributed mode loudspeaker and an actual filter response of the audio subsystem 606 deviates from a target filter response. Accordingly, audio subsystem 606 uses the feedback information to update one or more filters using the new frequency response. The one or more filters can include equalization filters, tuning filters, multiband compression filters, bass enhancement filter, sound enhancement filters, or combined filters for sound tuning or other audio signal post-processing used to enhance audio signals. Typical filters are implemented digitally with a plurality of filter taps. Rather than compute updated filter taps during operation of the information handling system, a plurality of predetermined sets of equalization filter taps for different profiles of active piezoelectric transducers may be stored in memory and loaded according to selectively enabled zones indicated in the feedback signal. In at least one embodiment, the predetermined equalization filter taps are determined to cause a user to have a similar audio experience even when different zones of piezoelectric transducers are enabled for the audio subsystem 606.

In at least one embodiment, system 600 updates the volume of signals corresponding to the zones enabled for audio subsystem 606 to compensate for the absence of signal output of piezoelectric transducers inactive in audio subsystem 606 to thereby maintain the same audio experience implemented by different combinations of piezoelectric transducers. The volume adjustment may be implemented by the audio subsystem 606 or by controller 608. A plurality of predetermined gain profiles corresponding to different profiles of piezoelectric transducers selectively configured for audio subsystem 606 may be stored in memory and loaded according to selected configurations of piezoelectric transducers.

If piezoelectric transducers 610 are configured to be driven by audio subsystem 606 and if controller 608 receives location information indicating a user digit in a zone proximate to one or more piezoelectric transducer, the controller 608 disables the audio signal for the zone corresponding to the location information (e.g., by blocking an audio received from audio subsystem 606 for that zone). In at least one embodiment, the piezoelectric transducer in that zone is configured to receive a signal generated by haptic feedback subsystem 604. The signal provides parameters (e.g., duration, vibration frequency, or intensity) for generating haptic feedback, which may vary according to the type of user input and may be user selectable and stored in memory. In at least one embodiment, controller 608 provides a feedback signal to audio subsystem 606. The feedback signal causes audio subsystem 606 to update the configuration of piezoelectric transducers that continue to be driven by audio subsystem 606 (e.g., to compensate for the piezoelectric transducer that is now driven by a signal generated by haptic feedback subsystem 604).

Figure 7:
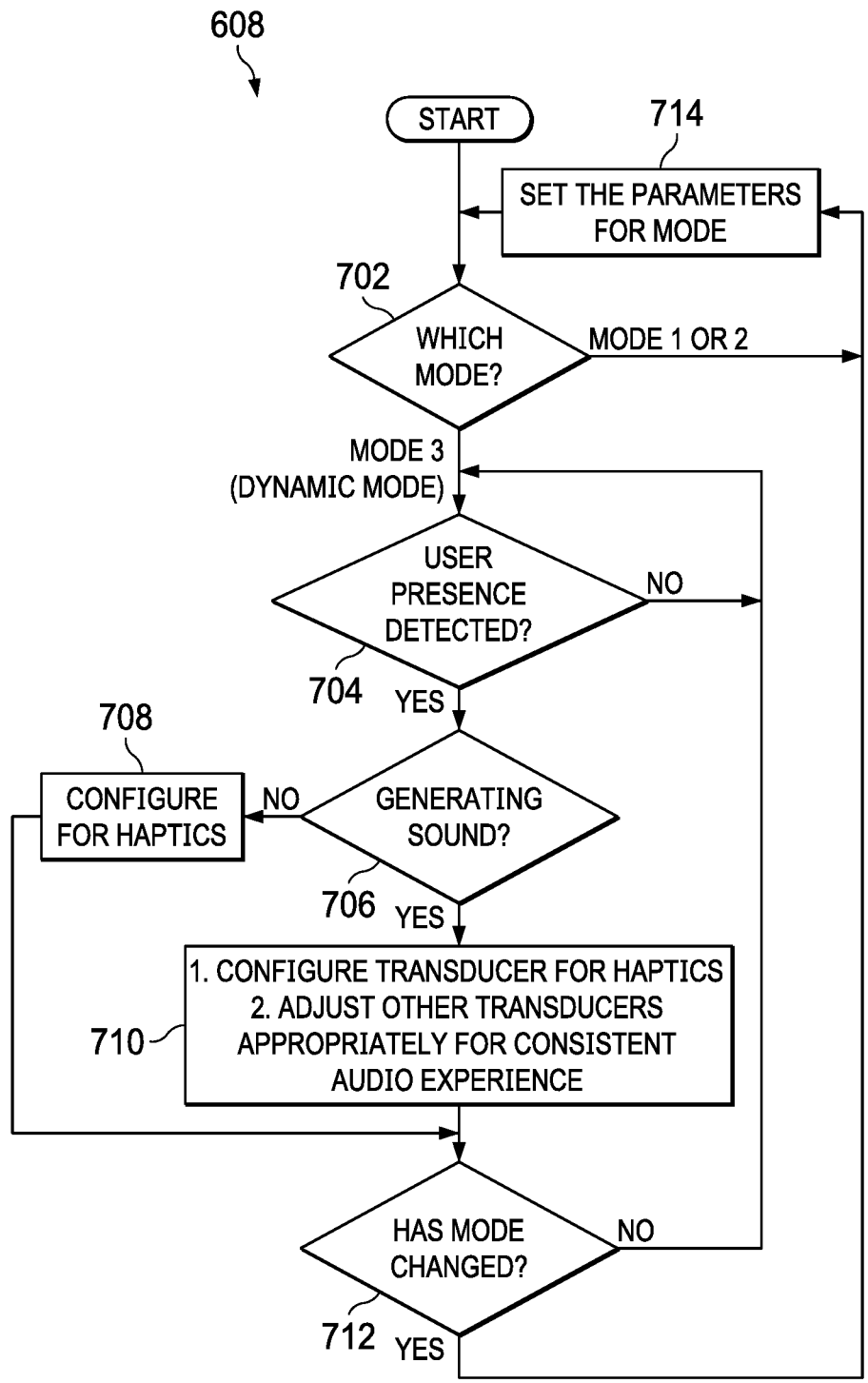
FIG. 7 illustrates information and control flows for an information handling system including dynamic configuration of multi-zone piezoelectric transducers for multi-functionality consistent with at least one embodiment of the invention.

Referring to FIGS. 6 and 7, in at least one embodiment, controller 608 determines a mode of operation of system 600 (702). For example, a first mode of operation configures piezoelectric transducers according to a default configuration that configures all piezoelectric transducers mechanically coupled to a surface for generating sound according to audio subsystem 606 and haptic feedback is disabled. A second mode of operation configures some of piezoelectric transducers 610 and surface 612 to generate sound according to audio subsystem 606 and others of piezoelectric transducers 610 to be responsive to haptic feedback subsystem 604. If system 600 is configured for either of those static configurations of piezoelectric transducers, then controller 608 sets parameters for each piezoelectric transducer accordingly (e.g., by driving each piezoelectric transducer with signals generated by a selected subsystem) (714).

If controller 608 determined that system 600 is operating in a dynamic mode (e.g., a third mode), system 600 continues to operate using a current configuration of the piezoelectric transducers until sensors 602 detect a user in proximity to a zone associated with one or more piezoelectric transducers (704). If sensors 602 detect a user in a zone in proximity to the piezoelectric transducers (e.g., a user digit or hand is in proximity to the keyboard), then controller 608 determines whether system 600 is generating sound (706). If system 600 is not generating sound at that time, then controller 608 configures piezoelectric transducers 610 to be controlled by haptic feedback subsystem 604 (708). If piezoelectric transducers 610 are being driven by audio subsystem 606 at that time, then controller 608 configures piezoelectric transducers in a zone proximate to the user to be controlled by haptic feedback subsystem 604 and adjusts parameters for other piezoelectric transducers that continue to operate in audio mode accordingly to provide a consistent user experience (710). If the operating mode remains dynamic (i.e., no change of operating mode to mode 1 or mode 2) (712), then controller 608 continues to selectively configure piezoelectric transducers 610 according to whether a user is detected proximate to the piezoelectric transducers (704). If user proximity has changed (e.g., a user digit is no longer present proximate to a piezoelectric transducer), then controller 608 configures a piezoelectric transducer that was previously controlled by haptic feedback subsystem 604 to be controlled by audio subsystem 606 to generate sound and causes parameter adjustments for piezoelectric transducers in other zones that continue to operate in audio mode accordingly (710). If the mode changes from a dynamic mode of selective configuration to a static configuration (712), then controller 608 updates the parameters according to the static configuration (714).

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Thus, techniques for implementing dynamic configuration of piezoelectric transducers for multi-functionality have been disclosed. The description of the invention set forth herein is illustrative and is not intended to limit the scope of the invention as set forth in the following claims. For example, while the invention has been described in an embodiment in which a portable information handling system implements the invention, one of skill in the art will appreciate that the teachings herein can be utilized with other information handling system components in other locations of the system (e.g., desktop computers, storage towers, external peripherals, keyboards, touchpads, smart speakers, etc.). Structures described herein may be implemented using software executing on a processor (which includes firmware) or by a combination of software and hardware. Software, as described herein, may be encoded in at least one tangible (i.e., non-transitory) computer readable medium. As referred to herein, a tangible computer-readable medium includes at least a disk, tape, or other magnetic, optical, or electronic storage medium. The terms "first," "second," "third," and so forth, as used in the claims, unless otherwise clear by context, is to distinguish between different items in the claims and does not otherwise indicate or imply any order in time, location or quality. Variations and modifications of the embodiments disclosed herein may be made based on the description set forth herein, without departing from the scope of the invention as set forth in the following claims.

What is claimed is:

1. A method for operating an information handling system comprising:

configuring a piezoelectric transducer mechanically coupled to a surface to operate responsive to a first subsystem in response to detection of presence of a user in a zone proximate to the information handling system; and configuring the piezoelectric transducer mechanically coupled to the surface to operate responsive to a second subsystem in response to detection of absence of the user in the zone proximate to the information handling system.

2. The method as recited in claim 1, further comprising:
configuring the information handling system in a dynamic mode of operation,
wherein the first subsystem is an audio subsystem of the information handling system,
wherein the second subsystem is a haptic feedback subsystem of the information handling system, and
wherein the information handling system has other modes of operation, in the other modes of operation, the piezoelectric transducer is configured to be responsive to only the first subsystem or only the second subsystem according to a predetermined configuration.

3. The method as recited in claim 1, further comprising:
adjusting signals driving additional piezoelectric transducers mechanically coupled to the surface in response to configuring the piezoelectric transducer mechanically coupled to the surface to operate responsive to the second subsystem.

4. The method as recited in claim 3, wherein the adjusting comprises:
updating filters used to generate the signals driving the additional piezoelectric transducers mechanically coupled to the surface; and
updating gain of signals driving the additional piezoelectric transducers mechanically coupled to the surface.

5. The method as recited in claim 1, further comprising:
detecting presence of the user in the zone proximate to the information handling system.

6. The method as recited in claim 1,
wherein presence includes physical contact or proximity of the user with a user input device, and
wherein the surface is a touchscreen disposed in an outer housing of the information handling system.

7. The method as recited in claim 1, wherein the piezoelectric transducer is one of a plurality of piezoelectric transducers distributed across the surface according to a natural resonant model of the surface, and the piezoelectric transducer is selectively configured to vibrate the surface as part of a distributed mode loudspeaker responsive to an absence of the user in the zone proximate to the piezoelectric transducer.

8. The method as recited in claim 4, wherein the filters include an equalization filter and the updating includes loading predetermined equalization filter taps to provide an audio experience using the additional piezoelectric transducers consistent with the audio experience prior to the adjusting.

* * * * *

UNITED STATES PATENT AND TRADEMARK OFFICE
CERTIFICATE OF CORRECTION

PATENT NO. : 11,429,155 B2
APPLICATION NO. : 16/589482
DATED : August 30, 2022
INVENTOR(S) : Douglas Jarrett Peeler and Srinivas Kamepalli Page 1 of 1

It is certified that error appears in the above-identified patent and that said Letters Patent is hereby corrected as shown below:

In the Claims

In Column 10, Line 14, Claim 2 replace "first" with --second--;
In Column 10, Line 16, Claim 2 replace "second" with --first--;
In Column 10, Line 28, Claim 3 replace "second" with --first--.

Signed and Sealed this
Seventh Day of November, 2023

Katherine Kelly Vidal
*Director of the United States Patent and Trademark Office*